US011926103B2

(12) United States Patent
Wang et al.

(10) Patent No.: US 11,926,103 B2
(45) Date of Patent: *Mar. 12, 2024

(54) PRECISION SYSTEM FOR ADDITIVE FABRICATION

(71) Applicant: Inkbit, LLC, Medford, MA (US)

(72) Inventors: Wenshou Wang, Quincy, MA (US); Gregory Ellson, Boston, MA (US); Yan Zhang, Lowell, MA (US); Desai Chen, Arlington, MA (US); Javier Ramos, Brookline, MA (US); Wojciech Matusik, Lexington, MA (US); Kiril Vidimce, Cambridge, MA (US)

(73) Assignee: Inkbit, LLC, Medford, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/525,222

(22) Filed: Nov. 12, 2021

(65) Prior Publication Data

US 2022/0281176 A1    Sep. 8, 2022

Related U.S. Application Data

(63) Continuation of application No. 16/925,910, filed on Jul. 10, 2020, now Pat. No. 11,173,667, which is a (Continued)

(51) Int. Cl.
*B29C 64/393* (2017.01)
*B29C 64/112* (2017.01)
(Continued)

(52) U.S. Cl.
CPC .......... *B29C 64/393* (2017.08); *B29C 64/112* (2017.08); *B29C 64/209* (2017.08);
(Continued)

(58) Field of Classification Search
CPC ... B29C 64/112; B29C 64/209; B29C 64/364; B29C 64/393; B29C 64/386
See application file for complete search history.

(56) References Cited

U.S. PATENT DOCUMENTS 3,931,287 A    1/1976 Kehr et al.
5,270,368 A    12/1993 Lent et al.
(Continued)

FOREIGN PATENT DOCUMENTS

JP    2015128884 A  *  7/2015  ......... B29C 67/0059
JP    2015221516 A     12/2015
(Continued)

OTHER PUBLICATIONS

Ligon, Samuel Clark, Robert Liska, Jurgen Stampfl, Matthias Gurr, and Rolf Mulhaupt. "Polymers for 3D printing and customized additive manufacturing." Chemical reviews 117, No. 15 (2017): 10212-10290.

(Continued)

*Primary Examiner* — Atul P. Khare
(74) *Attorney, Agent, or Firm* — Occhiuti & Rohlicek LLP

(57) ABSTRACT

An approach to precision additive fabrication uses jetting of cationic compositions in conjunction with a non-contact (e.g., optical) feedback approach. By not requiring contact to control the surface geometry of the object being manufactured, the approach is tolerant of the relative slow curing of the cationic composition, while maintaining the benefit of control of the deposition processes according to feedback during the fabrication processes. This approach provides a way to manufacture precision objects and benefit from material properties of the fabricated objects, for example, with isotropic properties, which may be at least partially a (Continued)

result of the slow curing, and flexible structures, which may not be attainable using conventional jetted acrylates.

19 Claims, 4 Drawing Sheets

Related U.S. Application Data continuation of application No. PCT/US2019/065436, filed on Dec. 10, 2019.

(60) Provisional application No. 62/777,422, filed on Dec. 10, 2018.

(51) Int. Cl.
| | |
|---|---|
| B29C 64/209 | (2017.01) |
| B29C 64/227 | (2017.01) |
| B33Y 10/00 | (2015.01) |
| B33Y 30/00 | (2015.01) |
| B33Y 50/02 | (2015.01) |
| B33Y 70/00 | (2020.01) |
| C09D 11/101 | (2014.01) |
| C09D 11/102 | (2014.01) |
| C09D 11/38 | (2014.01) |
| B29C 64/364 | (2017.01) |
| B29K 63/00 | (2006.01) |

(52) U.S. Cl.
CPC ............ *B29C 64/227* (2017.08); *B33Y 10/00* (2014.12); *B33Y 30/00* (2014.12); *B33Y 50/02* (2014.12); *B33Y 70/00* (2014.12); *C09D 11/101* (2013.01); *C09D 11/102* (2013.01); *C09D 11/38* (2013.01); *B29C 64/364* (2017.08); *B29K 2063/00* (2013.01)

(56) References Cited

U.S. PATENT DOCUMENTS

| | | | |
|---|---|---|---|
| 5,287,435 A | 2/1994 | Cohen et al. | |
| 5,303,141 A | 4/1994 | Batchelder et al. | |
| 5,889,084 A | 3/1999 | Roth | |
| 6,492,651 B2 | 12/2002 | Kerekes | |
| 7,198,826 B2* | 4/2007 | Gardner | B29C 64/112 |
| | | | 427/469 |
| 7,300,619 B2 | 11/2007 | Napadensky et al. | |
| 8,334,025 B2* | 12/2012 | Fong | B33Y 70/00 |
| | | | 522/15 |
| 8,846,777 B2 | 9/2014 | Bowman et al. | |
| 9,248,611 B2 | 2/2016 | Divine et al. | |
| 9,347,185 B2 | 5/2016 | Reda | |
| 9,441,084 B2 | 9/2016 | Heardon | |
| 9,963,836 B1 | 5/2018 | Brenner et al. | |
| 10,005,236 B2 | 6/2018 | Yudovin-Farber et al. | |
| 10,023,500 B2 | 7/2018 | O'Brien et al. | |
| 10,252,466 B2 | 4/2019 | Ramos et al. | |
| 10,335,994 B2* | 7/2019 | Napadensky | B29C 41/48 |
| 10,456,984 B2 | 10/2019 | Matusik et al. | |
| 10,569,470 B2 | 2/2020 | Donovan et al. | |
| 10,974,460 B2* | 4/2021 | Chen | H04N 1/00042 |
| 11,207,836 B2* | 12/2021 | Ramos | B33Y 10/00 |
| 11,384,250 B2* | 7/2022 | Moussa | B29C 64/112 |
| 2002/0104973 A1 | 8/2002 | Kerekes | |
| 2003/0092820 A1 | 5/2003 | Schmidt et al. | |
| 2007/0205528 A1 | 9/2007 | Patel et al. | |
| 2011/0244393 A1 | 10/2011 | Ikeda | |
| 2014/0107314 A1 | 4/2014 | Kawato et al. | |
| 2014/0239527 A1 | 8/2014 | Lee | |
| 2015/0261196 A1 | 9/2015 | Wilson et al. | |
| 2016/0023403 A1 | 1/2016 | Ramos et al. | |
| 2016/0257843 A1 | 9/2016 | Boydston et al. | |
| 2016/0332381 A1 | 11/2016 | Long et al. | |
| 2016/0347005 A1 | 12/2016 | Miller | |
| 2016/0376453 A1 | 12/2016 | Hearon | |
| 2017/0050374 A1 | 2/2017 | Minardi et al. | |
| 2017/0173892 A1 | 6/2017 | Steele | |
| 2017/0226267 A1 | 8/2017 | Shinohara et al. | |
| 2017/0291357 A1 | 10/2017 | Fong et al. | |
| 2017/0306171 A1 | 10/2017 | Mdavsky et al. | |
| 2017/0355147 A1* | 12/2017 | Buller | B23K 26/36 |
| 2018/0009932 A1 | 1/2018 | Hearon et al. | |
| 2018/0057414 A1 | 3/2018 | O'Brien et al. | |
| 2018/0071987 A1* | 3/2018 | Tsumuraya | B22F 10/85 |
| 2018/0136632 A1* | 5/2018 | Ochiai | G06F 30/00 |
| 2018/0141268 A1 | 5/2018 | Holt | |
| 2018/0148380 A1 | 5/2018 | Eckel et al. | |
| 2019/0039321 A1 | 2/2019 | Matzner et al. | |
| 2019/0283316 A1 | 9/2019 | Rolland et al. | |
| 2019/0322031 A1 | 10/2019 | Kritchman | |
| 2019/0337117 A1* | 11/2019 | Ganapathiappan | B29C 64/112 |

FOREIGN PATENT DOCUMENTS

| | | |
|---|---|---|
| JP | 2016087831 A | 5/2016 |
| JP | 2017528342 A | 9/2017 |
| JP | 2017537178 A | 12/2017 |
| WO | 2017/134674 A1 | 8/2017 |
| WO | 2018026829 A1 | 2/2018 |
| WO | 2018033296 A1 | 2/2018 |

OTHER PUBLICATIONS

Mendes-Felipe, Cristian, Juliana Oliveira, Ikerne Etxebarria, José Luis Vilas-Vilela, and Senentxu Lanceros-Mendez. "State-of-the-Art and Future Challenges of UV Curable Polymer-Based Smart Materials for Printing Technologies." Advanced Materials Technologies 4, No. 3 (2019): 1800618.

Sitthi-Amorn, Pitchaya, Javier E. Ramos, Yuwang Wangy, Joyce Kwan, Justin Lan, Wenshou Wang, and Wojciech Matusik. "MultiFab: a machine vision assisted platform for multi-material 3D printing." ACM Transactions on Graphics (TOG) 34, No. 4 (2015): 129.

* cited by examiner

Epoxy Monomer

Step 1: Acid catalyst generation under UV light

PRECISION SYSTEM FOR ADDITIVE FABRICATION

CROSS-REFERENCES TO RELATED APPLICATIONS

This application is a continuation of U.S. application Ser. No. 16/925,910 filed on Jul. 10, 2020, which is a continuation of International Application No. PCT/US2019/65436 filed on Dec. 10, 2019, which claims the benefit of U.S. Provisional application Ser. No. 62/777,422 filed on Dec. 10, 2018, the contents of all of which are hereby incorporated by reference in their entireties.

BACKGROUND OF THE INVENTION

This invention relates to the precision methods and systems used in additive fabrication.

Additive manufacturing, also referred to as 3D printing, refers to a relatively wide class of techniques for producing parts according to a computer-controlled process, generally to match a desired 3D specification, for example, a solid model. A number of different classes of materials have been used for such 3D printing, with different materials providing corresponding advantages and/disadvantages for different fabrication techniques. For example, a survey of materials may be found in Ligon et al. "Polymers for 3D printing and customized additive manufacturing." *Chemical reviews* 117, no. 15 (American Chemical Society, 2017), pp. 10212-10290.

A class of fabrication techniques jets material for deposition on a partially fabricated object using inkjet printing technologies. The jetted material is typically UV cured shortly after it deposited, forming thin layers of cured material. Acrylates are generally used, providing rapid curing and a hard material. To achieve precision fabrication, some techniques use mechanical approaches to maintain accurate layer-to-layer structure, for example, using mechanical rollers or "planarizers" to control the surface geometry, and therefore control the accuracy of the fabricated object. Therefore, rapid curing is a key feature to allow the planarization and obtain an accurately fabricated object.

However, the resulting material properties obtained with such inks may be insufficient. The invention intends to overcome this drawback.

SUMMARY OF THE INVENTION

One aim of the invention is to improve the material properties of an accurate object manufactured with an additive process using an inkjet printer.

In one aspect, in general, an approach to precision additive fabrication uses jetting of cationic compositions in conjunction with a non-contact (e.g., optical) feedback approach, which is used to control the jetting of subsequent layers based on scanning of a partially-fabricated object.

One class of compositions that have been used in 3D fabrication are cationic compositions using ultraviolet (UV) activated photoacid generators (PAGs), including for example, epoxides and vinyl ethers. For example, such compositions have been used in vat photopolymerization techniques. Use of cationic compositions may have certain advantages in the resulting material properties. Some of these properties may be related to the relatively long curing time after UV activation.

However, such compositions are ill-suited for being used with ink jet printers for additive fabrication. Although slow curing may be acceptable for 2D inkjet printing, it is not compatible with certain addition processes performed with today's inkjet printers. Indeed, given its slow curing, a planarization of the deposited UV curable cationic ink cannot be performed without leading to defects of the manufacture objects, low precision, or fouling of the printer. For example, mechanical surface control using rollers or planarizers may not be feasible because of the non-fully-cured state of the surface at the time such surface control would have to be performed. UV curable cationic inks, as is the case with other fabrication materials suitable for jetted additive fabrication, are not directly suitable for optical scanning as inadequate optical signal strength may propagate from the material during scanning.

In another aspect, in general, a 3D printing system includes an inkjet printer and a UV curable ink, characterized in that the inkjet printer also includes an optical feedback scanner, and a controller to control the emission of material from the printer jets according to the optical feedback of the jetted ink and the ink comprises a UV curable cationic compound. Preferably, the ink further comprises an optical enhancement component to improve the ability of the optical feedback scanner to accurately sense the surface and/or body properties of the emitted material forming a partially fabricated object.

In another aspect, in general, a method for 3D printing involves selectively depositing a photo-curable material prior to curing of said material, and then sensing the deposited photo-curable material after at least some curing of said material. Further selective depositing of said material is then controlled according to the sensing.

Aspects can include one or more of the following features.

The sensing of the deposited material is performed when the material is partially cured (e.g., less than 50% cured).

Subsequent layers are deposited when the material of the previously deposited layer is partially cured (e.g., less than 50% cured).

Selectively depositing the photo-curable material comprises depositing a cationic polymerizable component.

Selectively depositing the photo-curable material comprises depositing an optical enhancement component.

Depositing a cationic polymerizable component comprises depositing a photoacid generator (PAG).

The cationic polymerizable component is selected from the group consisting of a molecule with an epoxy functional group, a molecule with oxetane function group, a molecule with vinyl function group, or a combination thereof.

The molecule with an epoxy functional group comprises an epoxy monomer, an epoxy oligomer, an epoxy crosslinker, or any combination thereof.

The molecule with an epoxy functional group is selected from the group consisting of: 2,3-Epoxypropyl phenyl ether, o-Cresyl glycidyl ether, p-tert-Butyl phenyl glycidyl ether, Butyl glycidyl ether, 1,4-Butanediol diglycidyl ether, (3-4-Epoxycyclohexane) methyl3'-4'-Epoxycyclohexyl-Carboxylate, bis(7-oxabicyclo[4.1.0]hept-3-ylmethyl) adipate, modified Bisphenol A Liquid Epoxy Resin and a Bisphenol F Epoxy Resin. Epoxy resins based on bisphenol A/F or phenol novalacs are often modified in a proprietary fashion by each manufacturer to alter properties. The CAS numbers of the generics are as follows: Epoxy phenol novalac—0028064-14-4; Bisphenol A diglycidyl ether—1675-54-3; and Bisphenol F diglycidyl ether—2095-03-6

The molecule with an oxetane functional group comprises an oxetane monomer, an oxetane oligomer, an oxetane crosslinker, or any combination thereof.

The molecule with an oxetane functional group is selected from the group consisting of: ETERNACOLL® OXBP, 3-Ethyl-3-(methacryloyloxy)methyloxetane, bis[1-Ethyl(3-oxetanyl)]methyl ether, 3-Ethyl-3-hydroxymethyl oxetane, 3-Methyl-3-oxetanemethanol, 1,4-bis[(3-ethyl-3-oxetanyl-methoxy)methyl]benzene, 3-Ethyl-3-cyclohexyloxymethyl-oxetane, 3-Ethyl-3-phenoxymethyl-oxetane, and 3-ethyl-[(tri-ethoxysilylpropoxy)methyl]oxetane.

The molecule with a vinyl functional group comprises a vinyl monomer, a vinyl oligomer, a vinyl crosslinker, or any combination thereof.

The molecule with a vinyl functional group is selected from the group consisting of: 1,4-Cyclohexanedimethanol divinyl ether, Diethylene glycol divinyl ether, Triethylene glycol divinyl ether, and N-Vinyl-caprolactam.

The photoacid generator is selected from the group consisting of: Benzeneacetonitrile, 2-methyl-α-[2-[[(propylsulfonyl)oxy]imino]-3(2H)-thienylidene]-Ethanone, 1,1'-(1,3-propanediylbis(oxy-4,1-phenylene))bis(2,2,2-trifluoro-, 1,1'-bis(O-(propylsulfonyl)oxime), Bis(4-tert-butylphenyl)iodonium triflate (99% min), Bis(4-tert-butylphenyl)iodonium perfluoro-1-butanesulfonate (99% min), Bis(4-tert-butylphenyl)iodonium p-toluenesulfonate (99% min), (4-tert-Butylphenyl)diphenylsulfonium triflate, Triphenylsulfonium perfluoro-1-butanesufonate (9% min), Triphenylsulfonium triflate (λmax 233 nm), (4-Fluorophenyl)diphenylsulfonium triflate, (4-Bromophenyl)diphenylsulfonium triflate (λmax 242 nm), (4-Methylphenyl) diphenylsulfonium triflate, (4-Methoxyphenyl) diphenylsulfonium triflate (λmax 260 nm), (4-Iodophenyl) diphenylsulfonium triflate (λmax 262 nm), (4-Phenylthiophenyl)diphenylsulfonium triflate (λmax 298 nm), (4-Phenoxyphenyl)diphenylsulfonium triflate (λmax 256 nm), High molecular weight sulfonium tetrakis[pentafluorophenyl] borate, and 75% solution of Iodonium, (4-methylphenyl)[4-(2-methylpropyl)phenyl]-, hexafluorophosphate(1-) in propylene carbonate.

The photoacid generator is preferably between 0.1 wt % and 10 wt % of the material.

The photoacid generator is more preferably between 0.5 wt % and 5 wt % of the material.

The method further includes depositing particles that enhance the mechanical, thermal, and/or optical properties of the photo-curable material.

The method further includes depositing a surfactant with the photo-curable material.

The method further includes depositing an inhibitor with the photo-curable material.

The method further includes depositing a sensitizer.

Sensing the deposited material comprises capturing a surface of an object being printed.

Sensing the deposited material comprises capturing volumetric or tomographic data of an object being printed.

Controlling the further selective depositing comprises using an active feedback loop to modify the further selective depositing according to sensed data produced by the sensing.

Modifying the further selective depositing is based on measurements of a surface of an object being printed.

Modifying the further selective depositing uses measurements of the volumetric/tomographic data of an object being printed.

The method further includes heating a printing platform or printing chamber thereby speed up curing of photo-curable material.

In another aspect, in general, software includes instructions stored on a non-transitory machine-readable medium, which when executed by a processor causes control of any of the methods set forth above.

In another aspect, in general, a method includes providing a photo-curable material for use in any of the methods set forth above.

In another aspect, in general, a 3D printing system is configured to perform all the step of any of the methods set forth above.

Other features and advantages of the invention are apparent from the following description, and from the claims.

DETAILED DESCRIPTION

Figure 1:
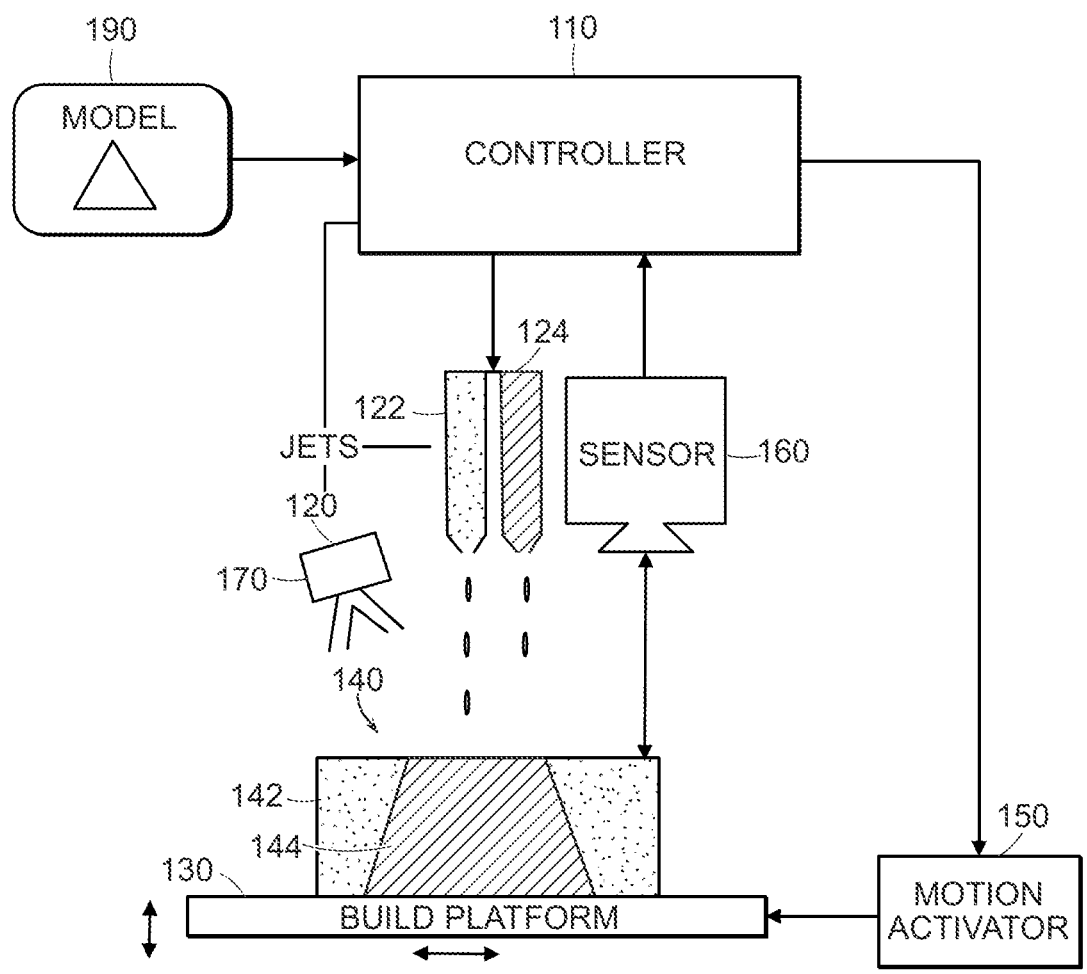
FIG. 1 is a schematic diagram of a 3D printer.
Figure 2:
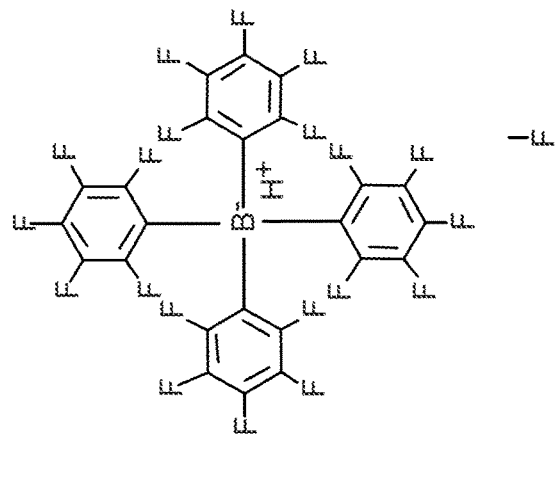
FIG. 2 is a flow diagram of the steps of epoxy polymerization.
Figure 2:
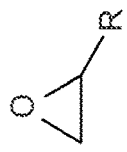
Figure 2:
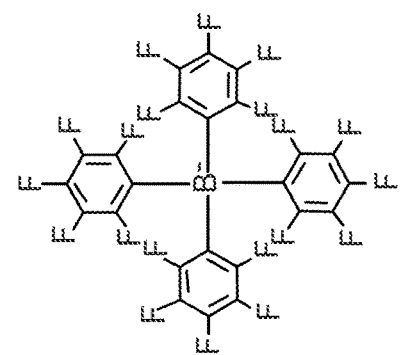
Figure 2:
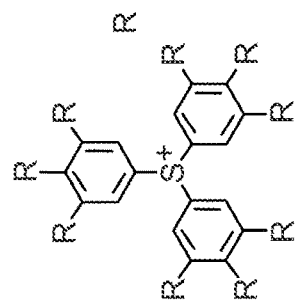
Figure 2:
Figure 2:
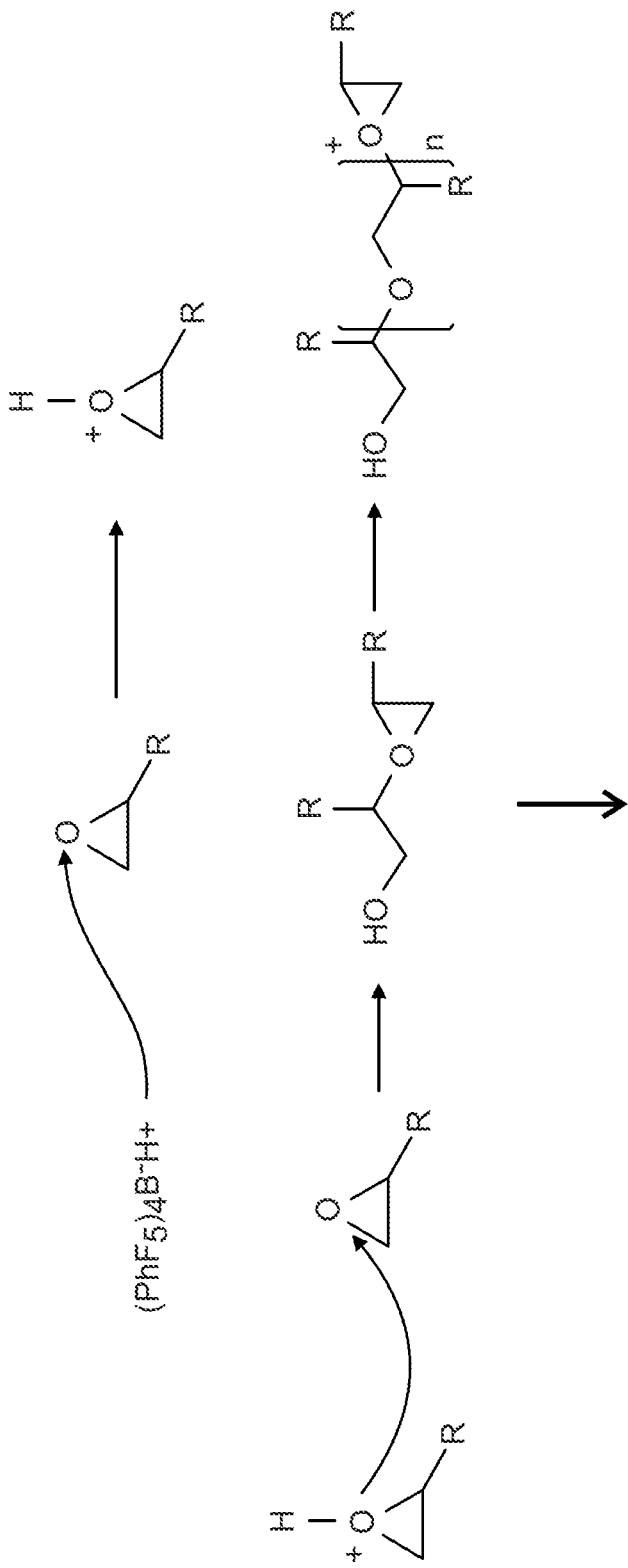
Figure 2:
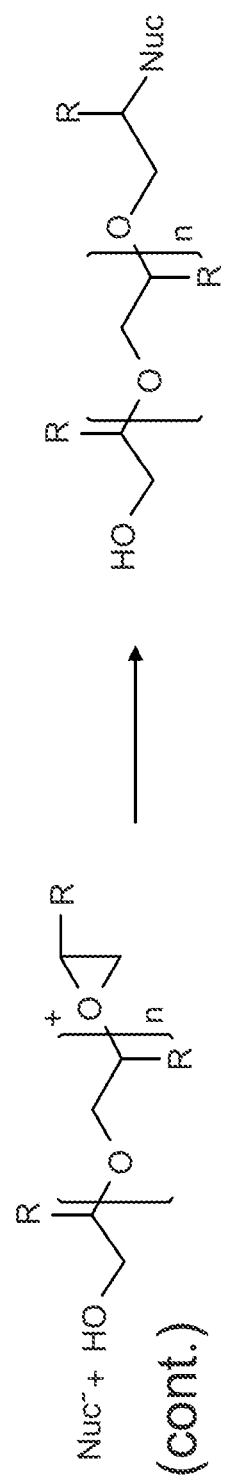

The description below relates additive fabrication, for example using a jetting-based 3D printer 100 shown in FIG. 1. The printer 100 uses jets 120 (inkjets) to emit material for deposition on a partially fabricated objected layers. In the printer illustrated in FIG. 1, the object is fabricated on a build platform, which is controlled to move related to the jets is a raster-like pattern to form successive layers, and in this example also to move relative to the jets to maintain a desired separation of the jets and the surface of the partially-fabricated object. As illustrated, there are multiple jets 122, 124, with one jet 122 being used to emit a support material to form a support structure 142 of the object, and another jet 124 being used to emit built material to form the object 144 itself. For materials for which curing is triggered by an excitation signal, such as an ultraviolet illumination, a curing signal generator 170 (e.g., a UV lamp) triggers curing of the material shortly after it is jetted onto the object. In other embodiments, multiple different materials may be used, for example, with a separate jet being used for each material. Yet other implementations do not necessarily use an excitation signal (e.g., optical, RF, etc.) and rather the curing is triggered chemically, for example, by mixing multiple components before jetting, or jetting separate components that mix and trigger curing on the object. Note that in some examples, after the additive deposition is complete, the object may be subject to further curing (e.g., to complete the curing), for example, by further exposing the object to UV radiation.

A sensor 160 is used to determine physical characteristics of the partially fabricated object, including one or more of the surface geometry (e.g., a depth map characterizing the thickness/depth of the partially fabricated object), subsurface (e.g., in the near surface comprising, for example, 10s or 100s of deposited layers) characteristics. The characteristic that may be sensed can include one or more of a material density, material identification, and a curing state. Various types of sensing can be used, including optical coherence tomography (OCT), laser profilometry, and/or as well as multi-spectral optical sensing, which may be used to distinguish different materials. In the illustrated printer, the sensor outputs a signal that may cause emission (e.g., fluorescence) and/or reflection, scattering, or absorption from or in the object. The sensor output signal may be provided from the top (i.e., the most recently deposited portion) of the object, while in some embodiments, the sensor output signal may come from below or other direction of the object.

Precision additive fabrication using inkjet technology has introduced use of optical-scanning-based feedback in order to adapt the deposition of material to achieve accurate object structure without requiring mechanical approaches that have been previously used. For example, such optical feedback techniques are described in U.S. Pat. No. 10,252,466, "Systems and methods of machine vision assisted additive fabrication," and U.S. Pat. No. 10,456,984, "Adaptive material deposition for additive manufacturing," which are incorporated herein by reference. However, optical feedback-based printers are not a prevalent commercial approach to 3D printing, perhaps due to the relative simplicity of approaches that do not achieve the precision attainable with optical feedback or that use mechanical approaches in conjunction with rapidly curing inks. Furthermore, many fabrication materials suitable for jetted additive fabrication are not directly suitable for optical scanning as inadequate optical signal strength may propagate from the material during scanning. For example, the material may be naturally substantially transparent and not reflect incident light suitably to be captured to yield an accurate characterization of the object being fabricated. However, with suitable incorporation of an optical enhancement component in the fabrication material, the ability to scan the material that has been deposited can be enhanced. Further details regarding suitable optical enhancement components may be found in copending International Application No. PCT/US19/59300, filed Nov. 1, 2019, titled "Optical Scanning for Industrial Metrology," which is incorporated herein by reference.

By not requiring contact to control the surface geometry of the object being manufactured, the approach is tolerant of the relative slow curing of the cationic composition, while maintaining the benefit of control of the deposition processes according to feedback during the fabrication processes. This approach provides a way to manufacture precision objects and benefit from material properties of the fabricated objects, for example, with isotropic properties, which may be at least partially a result of the slow curing, and flexible structures, which may not be attainable using conventional jetted acrylates. Furthermore, in cases when ongoing curing after scanning may change the geometry of the part, for example, due to shrinkage, predictive techniques (e.g., using machine-learning approaches, e.g., as described in co-pending application International Application PCT/US19/59567, filed Nov. 2, 2019, titled "Intelligent Additive Manufacturing," incorporated herein by reference) may be used in the control process to predict such changes, further accommodating the cationic compositions into a precision jetted fabrication approach.

A controller 110 uses a model 190 of the object to be fabricated to control motion of the build platform 130 using a motion actuator 150 (e.g., providing three degree of motion) and control the emission of material from the jets 120 according to the non-contact feedback of the object characteristics determined via the sensor 160. Use of the feedback arrangement can produce a precision object by compensating for inherent unpredictable aspects of jetting (e.g., clogging of jet orifices) and unpredictable material changes after deposition, including for example, flowing, mixing, absorption, and curing of the jetted materials.

The printer shown in FIG. 1 is only an example, and other printer arrangements that may be used are described for example, in U.S. Pat. No. 10,252,466, "Systems and methods of machine vision assisted additive fabrication," U.S. Pat. No. 10,456,984, "Adaptive material deposition for additive manufacturing," U.S. Pat. Pub. 2018/0056582, "System, Devices, and Methods for Injet-Based Three-Dimensional Printing," as well as in Sitthi-Amorn et al. "MultiFab: a machine vision assisted platform for multimaterial 3D printing." *ACM Transactions on Graphics (TOG)* 34, no. 4 (2015): 129.

Within printing systems of the type shown in FIG. 1, various types of materials may be used. The remainder of this description focusses on a class of materials, particularly UV-curable inkjet printable matrix material that changes phase from liquid to solid using the process of cationic polymerization. The method can be used for inkjet-based additive manufacturing of the type outlined above where a UV-curable resin is deposited and then cured using UV-light. In one embodiment, the composition of the UV-cured resin comprises the following components: a cationic polymerizable component and a photoacid generator (PAG). In accordance with an embodiment of the present invention, the cationic polymerizable component is: a molecule with an epoxy functional group, a molecule with oxetane function group, a molecule with vinyl function group, or the combination thereof.

Furthermore, in accordance with the embodiment of the present invention in which the cationic polymerizable component is a molecule with epoxy functional group, the molecule in various embodiments is an epoxy monomer, an epoxy oligomer, an epoxy crosslinker, or any combination thereof. Table 1 lists some of the cationic polymerizable molecules with epoxy functional group, but the invention is not limited to these embodiments.

TABLE 1

Examples of cationic polymerizable molecules with an epoxy function group

| Materials | CAS No. | Trade Name | Supplier |
| --- | --- | --- | --- |
| 2,3-Epoxypropyl phenyl ether | 122-60-1 | ERISYS* GE-13 | CVC Thermoset Specialties 844 N. Lenola Road Moorestown, NJ 08057 |
| o-Cresyl glycidyl ether | 0002210-79-9 | ERISYS* GE-10 | CVC Thermoset Specialties 844 N. Lenola Road Moorestown, NJ 08057 |
| p-tert-Butyl phenyl glycidyl ether | 0003101-60-8 | ERISYS* GE-11 | CVC Thermoset Specialties 844 N. Lenola Road Moorestown, NJ 08057 |
| BUTYL GLYCIDYL ETHER | 2426-08-6 | | Sigma-Aldrich Corp 3050 Spruce St. St. Louis, MO 63103 |
| 1,4-BUTANEDIOL DIGLYCIDYL | 2425-79-8 | | Sigma-Aldrich Corp |

TABLE 1-continued

Examples of cationic polymerizable molecules with an epoxy function group

| Materials | CAS No. | Trade Name | Supplier |
| --- | --- | --- | --- |
| ETHER | | | 3050 Spruce St. St. Louis, MO 63103 |
| (3-4-Epoxycyclohexane) methyl3'-4'-Epoxycyclohexyl-Carboxylate | 2386-87-0 | Omnilane OC 2005 | IGM Resins USA Inc. 3300 Westinghouse Blvd Charlotte, NC 28273 |
| bis(7-oxabicyclo[4.1.0]hept-3-ylmethyl) adipate | 3130-19-6 | Omnilane OC 3005 | IGM Resins USA Inc. 3300 Westinghouse Blvd Charlotte, NC 28273 |
| Modified Bisphenol A Liquid Epoxy Resin | | D.E.R. ™ 301 | Olin Epoxy Clayton, Missouri, United States of America |
| Bisphenol F Epoxy Resins | | D.E.R. ™ 354 | Olin Epoxy Clayton, Missouri, United States of America |

Furthermore, in accordance with various embodiments of the present invention, the cationic polymerizable component is a molecule with oxetane functional group. The molecule with oxetane functional group is an oxetane monomer, an oxetane oligomer, an oxetane crosslinker, or any combination thereof. Table 2 lists some of the cationic polymerizable molecules with an oxetane functional group, but the invention is not limited to these embodiments.

TABLE 2

Examples of cationic polymerizable molecules with oxetane function group

| Materials | CAS No | Trade Name | Supplier |
| --- | --- | --- | --- |
| ETERNACOLL ® OXBP | | ETERNACOLL ® OXBP | UBE America Inc 261 Madison Avenue, 28th Floor New York, NY 10016 |
| 3-ETHYL-3-(METHACRYLOYLOXY) METHYLOXETANE | 37674-57-0 | ETERNACOLL ® OXMA | UBE America Inc 261 Madison Avenue, 28th Floor New York, NY 10016 |
| bis[1-Ethyl(3-oxetanyl)]methyl ether | 18934-00-4 | ARON OXETANE OXT-221 | Toagosei Co., Ltd 1-14-1 Nishi-Shimbashi, Minato-ku, Tokyo 105-8419, Japan |
| 3-ETHYL-3-HYDROXYMETHYL OXETANE | 3047-32-3 | OXT101 | Toagosei Co., Ltd 1-14-1 Nishi-Shimbashi, Minato-ku, Tokyo 105-8419, Japan |
| 3-METHYL-3-OXETANEMETHANOL | 3143-02-0 | | Sigma-Aldrich Corp 3050 Spruce St. St. Louis, MO 63103 |
| 1,4-bis[(3-ethyl-3-oxetanylmethoxy)methyl] benzene | 142627-97-2 | GASON ® XDO | Guarson Chem Co. LTD Jiangyan District, Taizhou, Jiangsu Province, China |
| 3-Ethyl-3-cyclohexyloxymethyl-oxetane | 483303-25-9 | GASON ® CHOX | Guarson Chem Co. LTD Jiangyan District, Taizhou, Jiangsu Province, China |
| 3-Ethyl-3-phenoxymethyl-oxetane | 3897-65-2 | GASON ® EPOX | Guarson Chem Co. LTD Jiangyan District, Taizhou, Jiangsu Province, China |
| 3-ethyl-[(tri-ethoxysilylpropoxy) methyl]oxetane | 220520-33-2 | GASON ®TESOX | Guarson Chem Co. LTD Jiangyan District, Taizhou, Jiangsu Province, China |

Furthermore, in accordance with various embodiments of the present invention, the cationic polymerizable component is a molecule with vinyl functional group. The molecule with vinyl functional group is a vinyl monomer, a vinyl oligomer, a vinyl crosslinker, or any combination thereof. Some embodiments of molecules with vinyl functional groups are, but are not limited to, 1,4-Cyclohexanedimethanol divinyl ether, Diethylene glycol divinyl ether, Triethylene glycol divinyl ether, N-Vinyl-caprolactam, etc.

In accordance with various embodiments of the present invention, the cationic polymerizable composition comprises a photoacid generator (PAG). Photoacids are molecules which become more acidic upon absorption of light. This transformation is due either to the formation of strong acids upon photoassociation or to the dissociation of protons upon photoassociation. There are two main types of molecules that release protons upon illumination: photoacid generators (PAGs) and photoacids (PAHs). PAGs undergo proton photodissociation irreversibly.

Table 3 shows some embodiments of PAGs.

TABLE 3

| TRADE NAME | CHEMICAL NAME | CAS No. |
|---|---|---|
| PAG 103 | BENZENEACETONITRILE,2-METHYL-A-[2-[[(PROPYLSULFONYL)OXY]IMINO]-3(2H)-THIENYLIDENE]- | 852246-55-0 |
| PAG 203 | ETHANONE,1,1'-(1,3-PROPANEDIYLBIS(OXY-4,1-PHENYLENE))BIS(2,2,2-TRIFLUORO-,1,1'-BIS(O-(PROPYLSULFONYL)OXIME) | 300374-81-6 |
| PAG 94882 | BIS(4-TERT-BUTYLPHENYL)IODONIUM TRIFLATE(99% MIN) | 84563-54-2 |
| PAG 94884 | BIS(4-TERT-BUTYLPHENYL)IODONIUM PERFLUORO-1-BUTANESULFONATE (99% MIN) | 194999-85-4 |
| PAG 94885 | BIS(4-TERT-BUTYLPHENYL)IODONIUM P-TOLUENESULFONATE(99% MIN) | 131717-99-2 |
| PAG 69882 | (4-TERT-BUTYLPHENYL)DIPHENYLSULFONIUM TRIFLATE | 145612-66-4 |
| PAG 69904 | TRIPHENYLSULFONIUM PERFLUORO-1-BUTANESUFONATE(9% MIN) | 144317-44-2 |
| PAG 69902 | TRIPHENYLSULFONIUM TRIFLATE($\wedge$MAX 233 NM) | 66003-78-9 |
| PAG 69802 | (4-FLUOROPHENYL)DIPHENYLSULFONIUM TRIFLATE | 154093-57-9 |
| PAG 69702 | (4-BROMOPHENYL)DIPHENYLSULFONIUM TRIFLATE($\wedge$MAX 242 NM) | 255056-44-1 |
| PAG 69602 | (4-METHYLPHENYL)DIPHENYLSULFONIUM TRIFLATE | 81416-37-7 |
| PAG 69502 | (4-METHOXYPHENYL)DIPHENYLSULFONIUM TRIFLATE($\wedge$MAX 260 NM) | 116808-67-4 |
| PAG 69402 | (4-IODOPHENYL)DIPHENYLSULFONIUM TRIFLATE ($\wedge$MAX 262 NM) | 255056-46-3 |
| PAG 69302 | (4-PHENYLTHIOPHENYL)DIPHENYLSULFONIUM TRIFLATE ($\wedge$MAX 298 NM) | 111281-12-0 |
| PAG 69202 | (4-PHENOXYPHENYL)DIPHENYLSULFONIUM TRIFLATE($\wedge$MAX 256 NM) | 240482-96-6 |
| IRGACURE 290 | HIGH MOLECULAR WEIGHT SULFONIUM TETRAKIS[PENTAFLUOROPHENYL] BORATE | |
| IRGACURE 250 | 75% SOLUTION OF IODONIUM, (4-METHYLPHENYL)[4-(2-METHYLPROPYL) PHENYL]-, HEXAFLUOROPHOSPHATE(1-) IN PROPYLENE CARBONATE | 344562-80-7 |

In accordance with the various embodiments of PAGs, the content of PAGs in the formulation is in the range of 0.1 wt % to 10 wt %. Further, the content of PAGs in the formulation is in the range of 0.5 wt % to 5 wt %. In accordance with the various embodiments, a sensitizer is added. The sensitizer is a substance other than a PAG that facilitates the start of a cationic reaction, a few examples of sensitizers are: ITX, CPTX, UVS 1101, etc.

In addition to the above-mentioned components of the UV-curable printable matrix materials, in various embodiments the composition includes particles that enhance mechanical, thermal, and/or optical properties of the material. In some embodiments nano-scale particles are added to modify the spectral properties of the material. For example, the addition of 4-6% of Nanomer I.28E-BR (from Nanocor LLC) into the formulation could improve flame retardancy and heat resistance of the resulted printable objects. In some embodiments pigments or dyes are added for modification of the optical characteristics. For example, the addition of 0.5 wt % of Magenta DPGDA Dispersion (from Penn Color) into the formulation results in a red print.

Other additions to the composition in various embodiments include: sensitizers, Surfactants, inhibitors, and other structural fillers. It should be noted that if particulates are used as filler, the size of filler particles should be to be less than ½₀ of nozzle size and ideally less than 1 micron.

Ejecting the first layer of printable matrix material, in one embodiment, is accomplished using one or more inkjet dispensing devices. Ejecting the second fluid is also accomplished using one or more inkjet dispensing devices. The dispensing typically takes place at or near room temperature and less than 100° C. The first fluid and second fluid in one embodiment are cationic polymerizable printable matrix material: in some embodiments, the first fluid and the second fluid are the same printable matrix material; in some embodiments, the second fluid is a different type of ink printable matrix material, such as a free-radical polymerizable printable matrix material; in some other embodiment, the second fluid is another type of printable matrix material, such as a solvent based printable matrix material. Additional printable matrix material is used in other embodiments as support materials.

The additive manufacturing system uses a sensing device that images the build platform and printed objects during printing. The imaging system measures spatial dimensions, 3D surface, 3D volume, or materials of object/objects being printed. Based on the data from these measurements, the print data for the next layers is adapted/modified accordingly.

As introduced above, the fabrication material ("ink") preferably includes an optical enhancement component ("brightener"), which improves optical scanning by causing or increases the strength of or otherwise affects the characteristics (e.g., strength, spectral content, etc.) of optical (or other electromagnetic) emission from a material during additive fabrication. An "emission" of a signal from the material means any form of propagation of the signal (i.e., electromagnetic radiation), whether resulting from, without limitation, reflection or scattering of a signal in the material, from attenuation of a signal passing through the material, from fluorescence or luminescence within the material, or from a combination of such effects, and "scanning" the emitted signal means any form of sensing and/or processing of the propagated signal. In some examples, the approach makes use of an additive (or a combination of multiple additives) that causes optical emission or increases the received signal strength and/or improves the received signal-to-noise ratio in optical scanning for industrial metrology. Elements not naturally present in the material used for fabrication are introduced in the additives in order to increase fluorescence, scattering or luminescence. Such additives may include one or more of: small molecules, polymers, peptides, proteins, metal or semiconductive nanoparticles, and silicate nanoparticles. In cases when there are multiple materials deposited in fabrications, each material can include a different optical enhancement component (or combination of such components), thereby making them distinguishable in scanning. As examples, the optical enhancement component comprises a material of a stillbene class, such as 2,2'-(2,5-thiophenediyl)bis(5-tert-butylbenzoxazole), or a material from a thiophene class, such as 2,2'-(1,2-ethenediyl)bis(4,1-phenylene)bisbenzoxazole.

Further, the additive manufacturing system is intelligent enabled by the use of one or more of machine learning and feedback through machine vision. For example, A transformation will be applied to the 3D model of the part to be printed to produce a modified 3D model. The transformation is configured with configuration data to compensate for at least some characteristics of a printing process, such as shrinkage, mixing, and or flowing, for example, as described in U.S. application Ser. No. 16/672,711, "Intelligent Additive Manufacturing,"

The additive manufacturing system is equipped with a light source to cure the dispensed cationic polymerizable printable matrix material; the light source in various embodiments is a LED, LED arrays, mercury lamp, etc. The output spectra of light source should have overlap with the absorption peaks of the photo initiators used in the formulation. In some embodiments the additive manufacturing system is equipped with a heating element to speed up the polymerization of jetted materials. For example, the interior build volume can be heated during the whole time of printing. The heating element in other embodiments is applied to the object being printed at desired intervals. The heating element in various embodiments is a heater a ceramic heater and fan. In other embodiments heat is generated by infrared radiation.

Alternatively, in various embodiments a post-process step is carried out in order to improve the properties of the printed objects. In one embodiment the post-process includes exposing the finished print to light. This post-process is good for thin objects or the outer layers of larger objects.

In other embodiments the post-process involves exposing printed objects to thermal radiation. For example, a printed object is placed into a thermal oven for certain amount of time with a controlled temperature. Furthermore, the printed object in other embodiments is post-processed in programed temperature, such as post-processed at 80 C for 2 hours, then 100 C for One embodiment of a cationic photo polymerizable composition is listed in Table 4.

TABLE 4

| | EPX Formulation | | | | | |
|---|---|---|---|---|---|---|
| | Erisys GE-13 (%) | OMNI OC2005 (%) | 2,2-Bis(4-Glycidyloxy-phenyl)propane (%) | Irgacure 250 (%) | ITX (%) | Irgacure 290 (%) |
| EPX1 | 30 | 30 | 39 | | | 1 |
| EPX2 | 30 | 30 | 38.5 | 1 | 0.5 | |

The preparation of this composition begins with the addition of 40 g of bisphenol A diglycidyl ether, 30 g of Omnilane OC 2005, 30 g of Erisys GE-13 and 1 g of Irgacure 290 (as photoinitiator) into a 200 ml amber bottle. The resulting mixture is stirred with magnetic stir bar until the solids (Irgacure 290) dissolved completely and a uniform solution results.

The fluid properties of the composition are shown in Table 5. In general the printing material has viscosities between 3-20 cps at jetting temperature and more ideally between 5-15 cps at jetting temperature. The change of viscosity should be less than 2 cps during jetting. In addition the printing material has a surface tension between 15-40 mN/m at jetting temperature.

TABLE 5

| | Fluid properties | | | |
|---|---|---|---|---|
| | Temperature (° C.) | | | |
| | 25 | 50 | 60 | 70 |
| Viscosity (cPs) | 105 | 25 | 17 | 11 |
| Surface tension (mN/m) | 45 | | | |

Figure 3:
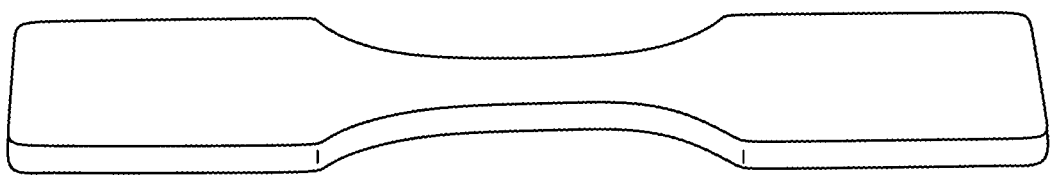
FIG. 3 is a rendition of a "dog bone" shaped printed product using cationic photo-curable material.

To determine the mechanical properties of the composition, Dogbones (FIG. 3) with ASTM D638 accompliance were printed and post-cured with three different conditions: (1) 90° C. for 1 h, denoted as EPX1-a; (2) 90° C. for 2 h, denoted as EPX1-b; (3) 90° C. for 2 hrs and 120° C. for 2 hrs, denoted as EPX1-c. and their mechanical properties after post-curing were tested. FIG. 3 shows a sample 3D object that was printed using cationic photo-curable matrix material. The printing process used a closed feedback loop using an Optical Coherence Tomographic (OCT) scanner to provide accurate measurements for the feedback printing loop. The print data was modified during the printing process based on the volumetric data acquired by the OCT scanner. The mechanical properties are shown in Table 6.

TABLE 6

| | Mechanical Properties | | | |
|---|---|---|---|---|
| Sample | Tensile strength (MPa) | Young's Modulus (MPa) | Elongation at break (%) | Tg(°C) |
| EPX1-c | 95 ± 10 | 2496 ± 150 | 9 ± 2 | 91 |
| EPX1-b | 86 ± 11 | 2380 ± 100 | 9 ± 2 | |
| EPX1-a | 75 ± 6 | 2020 ± 110 | 8 ± 2 | |
| EPX1 | 45 ± 8 | 1580 ± 80 | 7 ± 3 | |

A number of implementations have been described. Nevertheless, it will be understood that various modifications may be made without departing from the spirit and scope of the disclosure. For example, various forms of the materials shown above may be used, with steps re-ordered, added, or removed. Accordingly, other implementations are within the scope of the following claims.

The examples presented herein are intended to illustrate potential and specific implementations of the present disclosure. The examples are intended primarily for purposes of illustration of the invention for those skilled in the art. No particular aspect or aspects of the examples are necessarily intended to limit the scope of the present invention.

The figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present disclosure, and therefore, a more detailed description of such elements is not provided herein.

Unless otherwise indicated, all numbers expressing lengths, widths, depths, or other dimensions and so forth used in the specification and claims are to be understood in all instances as indicating both the exact values as shown and as being modified by the term "about." As used herein, the term "about" refers to a ±10% variation from the nominal value. Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques. Any specific value may vary by 20%.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. An apparatus for use in carrying out additive manufacturing of an object, said apparatus comprising:
    an ink that comprises a material and an optical enhancement component, said material being capable of undergoing cationic polymerization in response to illumination thereof and comprising an epoxy functional group and a photoacid generator,
    a platform upon which said object is fabricated,
    a printer that receives said ink and deposits said ink on said platform,
    a lamp that triggers curing of said material on said platform on a layer-by-layer basis,
    a motion actuator that causes relative motion between said printer and said platform, and
    a controller configured to carry out non-contact feedback control over said additive manufacturing based on non-contact inspection of said object during fabrication thereof while said ink is in a partially cured state and while said ink is curing, wherein said curing of said ink takes place only via cationic polymerization, whereby said object is cured only by cationic polymerization, and wherein said non-contact inspection comprises determining geometry of said partially-fabricated object.

2. The apparatus of claim 1, further comprising a support material to form a support structure for said object.

3. The apparatus of claim 1, further comprising a model of said object, wherein said controller is configured to receive said model and to use said model during said non-contact feedback control.

4. The apparatus of claim 1, wherein said motion actuator provides three degrees of freedom of movement.

5. The apparatus of claim 1, wherein said controller is configured to compensate for flowing, mixing, absorption, and curing of said ink during said non-contact feedback control.

6. The apparatus of claim 1, wherein said ink comprises a photoacid generator is present in an amount between 0.1 wt. % and 10 wt. % of the material.

7. The apparatus of claim 1, wherein said ink comprises a sensitizer that facilitates start of a cationic reaction.

8. The apparatus of claim 1, wherein said ink comprises particles that cause said ink to have a strength that exceeds that of said material.

9. The apparatus of claim 1, wherein said optical enhancement component comprises particles that cause said ink to have a brightness that exceeds that of said material during said additive manufacturing.

10. The apparatus of claim 1, wherein said optical enhancement component comprises particles that cause said ink to emit electromagnetic radiation to an extent greater than said material during additive manufacturing.

11. The apparatus of claim 1, wherein said printer comprises a jet for jetting said ink and wherein said ink is configured to have a viscosity that changes by less than two centipoise during jetting thereof by said jet.

12. The apparatus of claim 1, wherein said printer comprises a jet that jets said ink towards said platform and wherein said ink is configured to have a viscosity of between five and fifteen centipoise when said ink is being jetted towards said platform by said jet.

13. The apparatus of claim 1, wherein said ink is configured to have a surface tension of between fifteen and forty millinewtons per meter when being jetted towards said platform.

14. The apparatus of claim 1, wherein said ink, when cured by said lamp, has a tensile strength of 45±8 megapascals.

15. The apparatus of claim 1, wherein said ink, when cured by said lamp, has a Young's modulus of 1,580±80 megapascals.

16. The apparatus of claim 1, wherein said ink is configured to cause said object manufactured therefrom to elongate by 9±2%, 8±2%, or 7±3%.

17. The apparatus of claim 1, wherein said printer comprises first and second jets, wherein said first jet receives said ink, and wherein said second jet receives a support material.

18. The apparatus of claim 1, wherein said printer comprises a non-contact sensor in data communication with said controller, wherein said non-contact sensor carries out said non-contact inspection of said object's geometry during fabrication thereof.

19. The apparatus of claim 1, wherein said ink consists of at most one photo-polymerizable component and wherein said at most one photo-polymerizable component is said material.

* * * * *